Figure 5:
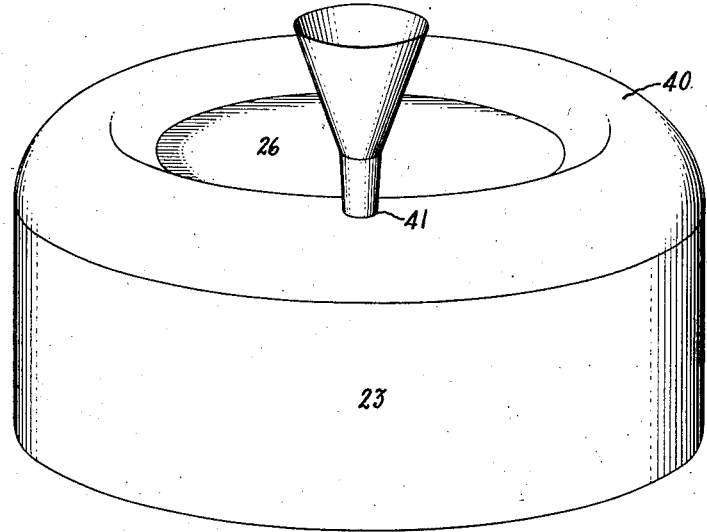

Aug. 14, 1945.    G. CAMILLI    2,382,857
ELECTRIC INDUCTION APPARATUS
Filed April 15, 1943    2 Sheets-Sheet 1
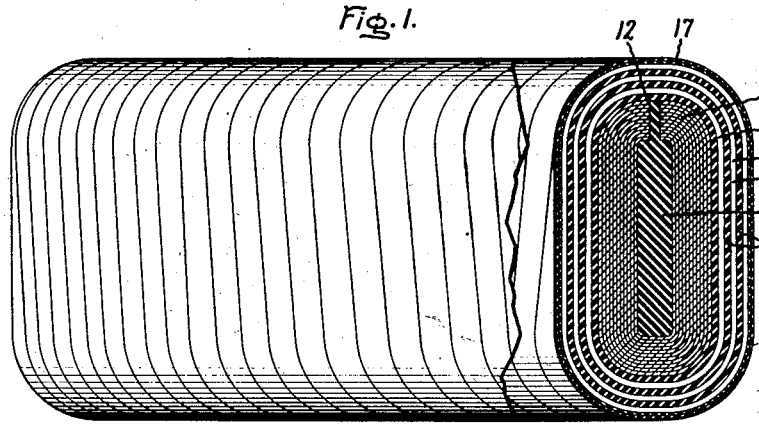
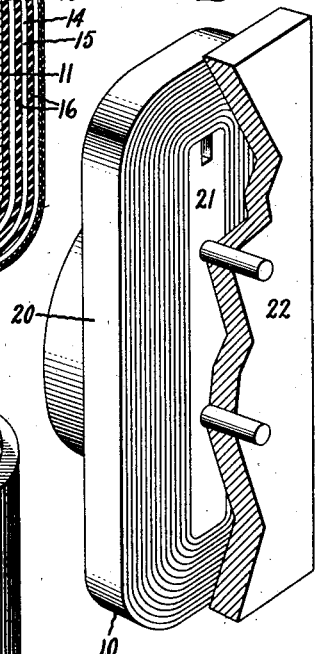
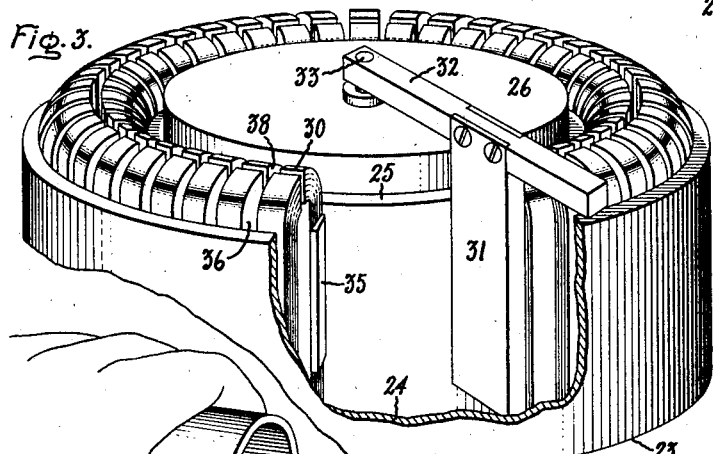
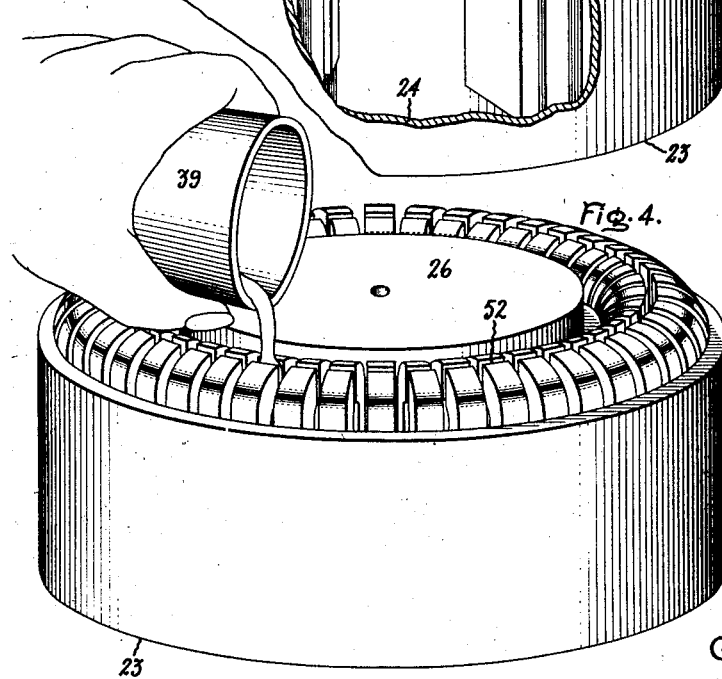
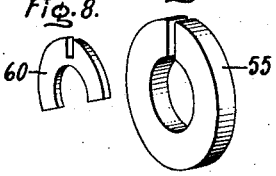
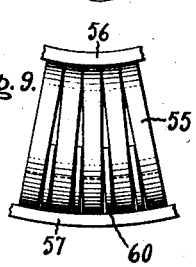
Inventor:
Guglielmo Camilli,
by Harry E. Dunham
His Attorney.

Aug. 14, 1945.   G. CAMILLI   2,382,857
ELECTRIC INDUCTION APPARATUS
Filed April 15, 1943   2 Sheets-Sheet 2

Inventor:
Guglielmo Camilli,
by Harry E. Dunham
His Attorney.

Patented Aug. 14, 1945

2,382,857

UNITED STATES PATENT OFFICE 2,382,857

ELECTRIC INDUCTION APPARATUS

Guglielmo Camilli, Pittsfield, Mass., assignor to General Electric Company, a corporation of New York Application April 15, 1943, Serial No. 483,163

6 Claims. (Cl. 175—356)

My invention relates to electric induction apparatus and particularly to cores for electric induction apparatus such as current transformers and to an improved method of forming the core.

Protective arrangements and particularly differential protective arrangements for station buses usually employ electric induction apparatus such as current transformers for deriving currents which are respectively proportional to the magnitudes of the currents at different points in the bus system, or portions thereof being protected. A system which employs such current transformers and particularly a system for power buses which embody highly inductive rotating apparatus which are subject to sudden changes in current under certain conditions, such as fault conditions, may cause the current transformers to saturate resulting in variation in the transformer ratio. It has therefore been suggested to employ in such protective systems non-saturable apparatus such as a transformer including a secondary winding wound on a toroidal ring made up of non-magnetic material with the primary winding passing through the hole in the toroid. Such transformers which are usually called air core transformers, have a much lower secondary current obtainable from a given primary current than from transformers which employ the conventional magnetic iron core. Thus when air core transformers are used in order to obtain relay operation at an acceptably low value of internal fault current, it is usually necessary to employ a relay of extremely high sensitivity, such as one of the polarized type or of one using a vacuum tube.

It has therefore been suggested to employ a closed magnetic core formed of a plurality of magnetic sections assembled in the form of a closed or rectangular core and having an insulating and non-magnetic material between the magnetic sections and with a secondary winding distributed around such a closed magnetic core construction so as to substantially neutralize the inductive effects of stray fields on the transformer. Such a construction is described and claimed in a copending application Serial No. 381,689, Sinks, filed March 4, 1941, and assigned to the same assignee as this present invention (now Patent 2,341,954, granted February 15, 1944).

It is therefore an object of my invention to provide an improved electric induction apparatus of the type described in the above-mentioned Sinks application.

A further object of my invention is to provide an improved non-saturating electric induction apparatus which is simple in construction, economical to manufacture, and efficient in operation.

A further object of my invention is to provide an improved method for forming a core for an electric induction apparatus.

Further objects and advantages of my invention will become apparent from the following description referring to the accompanying drawings, and the features of novelty which characterize my invention will be pointed out with particularity in the claims annexed to and forming a part of this specification.

Figure 6:
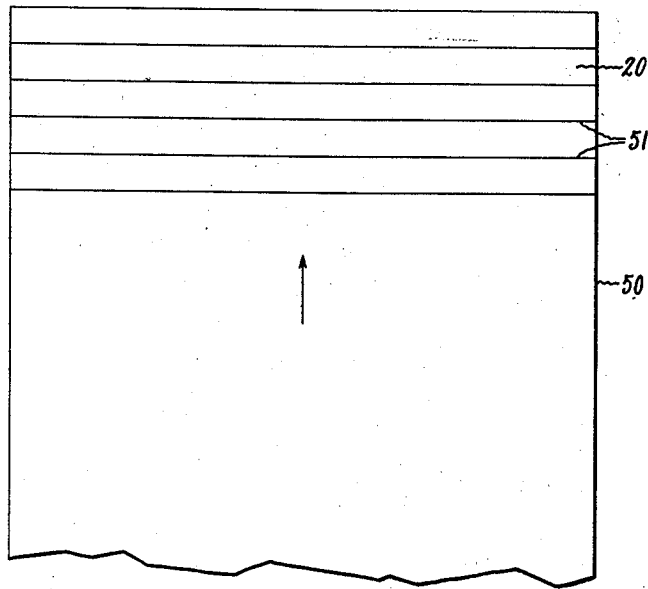

In the drawings, Fig. 1 is a side view in partial section illustrating an electric induction apparatus which is provided with an embodiment of my invention; Fig. 2 is a perspective view of one of the ring-shaped members formed of magnetic material, which is on a winding form, and which is employed in the transformer illustrated in Fig. 1; Fig. 3 is a perspective view of a portion of a mold illustrating a step of my improved method of forming a core for the electric induction apparatus shown in Fig. 1; Fig. 4 illustrates a portion of the mold of Fig. 3 with the sections of the core member in place and illustrating another step of my improved method of forming the core member employed in the transformer of Fig. 1; Fig. 5 is a perspective view of the closed mold which is employed during a further step of forming the improved core member used in the apparatus of Fig. 1; Fig. 6 illustrates a highly directional sheet of magnetic strip steel which is cut to form the ribbons with which the magnetic members may be wound which form the core member of Fig. 1; and Figs. 7, 8 and 9 illustrate modifications of the core sections as shown in Fig. 2.

In the drawings I have illustrated my improved core member which has particular application as a core for a current transformer, but it is to be understood that my invention may be employed with any other suitable electric induction apparatus. The transformer as is illustrated in the drawings includes a core having a plurality of disk shaped members formed of magnetic material, the members being assembled side by side with gaps therebetween to form a closed magnetic core. In order to provide an integral structure a suitable insulating means, such as a plastic or liquid hardenable insulating compound is provided in the gaps between the magnetic sections. The disk shaped members may be formed in any manner such as by winding up a plurality of ring shaped members from strips of magnetic material.

Referring more particularly to Fig. 1 of the drawings I have illustrated an electric induction apparatus including a core formed of a plurality of disk or ring shaped members 10 placed side by side, which will be described in more detail hereinafter. In the hollow portion of each of the ring shaped members 10 and between them there is placed a suitable insulating material 11 such as a liquid or plastic insulating compound which is hardenable under suitable conditions, such as by the application of heat. Around the core member 10 is placed a layer of insulation 12 and any suitable number of layers of wire so as to provide the secondary winding for the electric induction apparatus. In the drawings I have illustrated three such layers of wire 13, 14 and 15 which have suitable insulation layers 16 therebetween distributed through and around the toroidally shaped core. Around the outer conducting layer may be placed a suitable insulation layer, such as a plurality of turns of paper 17 wrapped through and around the toroidal shaped core and coil member.

As has been stated above, in certain protective system applications it is desirable to have a current transformer with such a core that the flux and magnetomotive force characteristics are linear or in other words with a core structure which will not saturate. In order therefore to provide a closed core member with a plurality of magnetic sections with air gaps therebetween I form a plurality of magnetic sections 10 which may be assembled together in the form of a toroid as is shown in Fig. 3. Each of the magnetic sections 10 may be formed in any suitable manner, and in Fig. 2 it will be seen that I have wound a ribbon of magnetic material 20 around a suitable form 21 so as to provide a ring shaped magnetic core member 10. These magnetic wound core members may be formed in any suitable manner such as by winding on the form 21 which is suitably held in a jig 22. The disk shaped members 10 may then be removed from the form and annealed in the conventional manner.

After a suitable number of core sections or disk shaped members have been formed in the manner as described above they may be stacked in a mold having any suitable shape and as shown in Fig. 3 I provide a toroidal shaped mold 23 having inner and outer partitions 24 and 25 which have approximately the same dimensions as that of the ring shape members which are to be stacked therein. The toroidal shaped core may be supported in any suitable manner such as on a cylindrical wooden shaped member 26.

The disk or ring shaped members may be stacked in the mold in any suitable manner, such as by stacking for instance one in the mold in the position as shown by the numeral 30 and holding it stationary in the mold in any suitable manner as the remaining sections are stacked up one after the other next to the one indicated by the numeral 30. As each section is stacked into the mold it may be forced tightly against the adjacent one by means of a member 31, which is supported by a bar 32 which is in turn pivoted at 33 in the center of the support 26. As each section is then stacked next to the adjacent section the operator may push on the end of the bar 32 and force the last stacked section tightly against the remaining sections which have already been stacked. In order to provide a suitable gap between each of the magnetic sections, the sections may be so stacked that the sections are spaced from each other at least at the outer diameter of the toroidal shaped mold. Also, in order to insure relatively uniform gaps between each of the members as they are placed side by side in a toroidal form, a wedge shaped insulating member 35 may be placed on one surface such as adjacent the inner diameter of each of the magnetic members 10. The insulating strip 35 may be made wedge shape since of course the gaps between each of the sections will be slightly larger at the outside diameter 36 than it is at the inside diameter 38 due to the toroidal shape of the mold.

After a suitable number of magnetic sections have been stacked in the mold a suitable insulating resinous or cement material may be poured into the mold, such as from a vessel 39 so as to fill in the hollow portions of each of the magnetic sections and form the insulating material indicated by the numeral 11 in Fig. 1. Also, before stacking the various magnetic sections in the mold 23 in the manner as shown in Fig. 3, a small amount of the resinous plastic material may be placed in the bottom of the mold so as to hold each of the magnetic sections in place during the stacking operation. The mold may then be completely filled by the insulating resinous material from the vessel 39, as is shown in Fig. 4 after all the magnetic sections have been stacked in place. In order to completely fill the mold another section 40, as is illustrated in Fig. 5, may be placed over the section 23 and the insulating compound introduced into the complementary mold sections 23 and 40 through an opening 41 until the mold is filled. When a thermosetting insulating resinous material is employed, the mold when closed, as is shown in Fig. 5, may be placed in an oven until the insulating compound is cured. The mold may then be broken off and an integral structure is provided upon which the various secondary winding layers may be wound as is shown in Fig. 1.

When a primary winding passes through the hole in the toroidal shaped core with the secondary winding as is shown in Fig. 1 it will be apparent that the flux path will be around the toroidal shaped core. When each of the magnetic sections 10 is formed of magnetic strip steel which has a highly direction magnetic characteristic the ribbons 20 which form the section 10 may be cut from a sheet of magnetic material 50, as is shown in Fig. 6, which has its highly directional characteristic, as indicated by the arrow, perpendicular with cuts 51 which forms the ribbon 20. It will therefore be seen when the ribbons are wound up and stacked in a manner as described above the flux path around the toroid will be in line with the most favorable magnetic direction.

Magnetic sections 10 are provided with a discontinuity 52 which is perpendicular to the sides of the ring shape member so as to prevent current circulating therein perpendicular to the flux path around the closed core. It will further be seen that the discontinuity 52 also provides a further entrance through which the plastic material may flow from the vessel 39 when the plastic material is being introduced into the mold as is shown in Fig. 4.

Instead of forming the magnetic section 10 from a wound strip of magnetic material it is also possible to use a solid disk shaped member 55 as is shown in Fig. 7. These members may then be stacked in a mold a portion of which is shown in Fig. 9 having inner and outer surfaces 56 and 57. In this modification it will be seen that the rings 55 are stacked with their edges substantially touching at the inner diameter or at the inner surface 56 so that an air gap may be provided which varies in distance from substantially no air gap at the inner periphery to the maximum at the outer periphery of the toroidal shaped core.

The toroidal shaped core formed of a plurality of sections stacked side by side provides a transformer construction which has a no load voltage which is approximately three times that of the transformer unit of the same size having an air core construction. If it is necessary to obtain still higher output voltage half washers 60, one of which being shown in Fig. 8, may be interleaved with the washers 55 so as to decrease the width of the non-magnetic gap at the outer half of the gap between each of the magnetic sections 55.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. A magnetic core for electromagnetic induction apparatus comprising, in combination, a plurality of rings of magnetic material arranged side by side in spaced relation so as to form a hollow re-entrant magnetic flux path having at least as many air gaps as there are rings, and a hardened plastic non-magnetic insulating material completely filling the spaces inside and between said rings so as to form a rigid self-supporting physically closed magnetic core with a substantially linear magnetizing characteristic.

2. A magnetic core for electromagnetic induction apparatus comprising, in combination, a plurality of rings of magnetic material arranged side by side in spaced relation so as to form a hollow re-entrant magnetic flux path having at least as many air gaps as there are rings, and a hardened plastic non-magnetic insulating material completely filling the spaces inside and between said rings and being substantially flush with the edges of said rings so as to form a rigid self-supporting physically closed magnetic core with a substantially linear magnetizing characteristic and whose surface is substantially coextensive with the edges of said rings.

3. A closed magnetic core for electromagnetic induction apparatus comprising, in combination, a plurality of rings of magnetic material arranged side by side in spaced relation so as to form a hollow re-entrant magnetic flux path having at least as many air gaps as there are rings, each of said rings being provided with a transverse cut so as to prevent it from being a closed electrical conducting path, and a hardened plastic non-magnetic insulating material completely filling the spaces inside and between said rings and the spaces within said cuts in said rings so as to form a rigid self-supporting physically closed magnetic core.

4. A magnetic core for electromagnetic induction apparatus comprising, in combination, a plurality of identical rings of magnetic material arranged side by side in equal spaced relation so as to form a hollow toroidal magnetic flux path having at least as many equal air gaps as there are rings, said rings having flat parallel sides which are perpendicular to their edges and parallel to different radii of the toroid whereby the air gaps progressively increase in length from the inner surface to the outer surface of the toroid, and a hardened plastic non-magnetic insulating material completely filling the spaces inside and between said rings so as to form a rigid self-supporting physically closed magnetic core with a substantially linear magnetizing characteristic.

5. A magnetic core for electromagnetic induction apparatus comprising, in combination, a plurality of identical rings of magnetic material arranged side by side in equal spaced relation so as to form a hollow toroidal magnetic flux path having at least as many equal air gaps as there are rings, said rings having flat parallel sides which are perpendicular to their edges and parallel to different radii of the toroid whereby the air gaps progressively increase in length from the inner surface to the outer surface of the toroid, magnetic inserts in the longest parts of said air gaps so as simultaneously to decrease the effective length of the air gaps and increase their number, and a hardened plastic non-magnetic insulating material completely filling the spaces inside said rings and between said rings and said magnetic inserts so as to form a rigid self-supporting physically closed magnetic core.

6. The combination as in claim 1 in which said rings are formed of wound magnetic strip material with a grain effect whose direction of maximum permeability is parallel to the direction of flux in said re-entrant flux path.

GUGLIELMO CAMILLI.